United States Patent

[11] 3,617,256

| [72] | Inventors | Robert T. Joseph<br>Richboro, Pa.;<br>Jack Trechock, Woodbury Heights, N.J.;<br>Erik Saller, Stamford, Conn.; Josiah Work,<br>Harlingen, Tex. |
|---|---|---|
| [21] | Appl. No. | 708,872 |
| [22] | Filed | Feb. 28, 1968 |
| [45] | Patented | Nov. 2, 1971 |
| [73] | Assignee | FMC Corporation<br>New York, N.Y. |

[54] PROCESS FOR SIMULTANEOUSLY PRODUCING POWDERED IRON AND ACTIVE CARBON
9 Claims, 3 Drawing Figs.

| [52] | U.S. Cl. | 75/36 |
|---|---|---|
| [51] | Int. Cl. | C21b 13/00 |
| [50] | Field of Search | 75/33, 36 |

[56] References Cited
UNITED STATES PATENTS

| 2,792,298 | 5/1957 | Freeman | 75/33 X |
| 2,944,884 | 7/1960 | Halvorson | 75/33 |
| 3,029,141 | 4/1962 | Sibakin et al. | 75/33 X |
| 3,046,106 | 7/1962 | Hemminger et al. | 75/36 |
| 3,126,277 | 3/1964 | Smith | 75/33 X |
| 3,149,961 | 9/1964 | Moklebust | 75/33 X |
| 3,180,725 | 4/1965 | Meyer et al. | 75/33 |
| 3,185,563 | 5/1965 | Jones et al. | 75/33 X |
| 3,219,436 | 11/1965 | Heitmann et al. | 75/36 X |
| 2,248,735 | 7/1941 | Batie | 75/33 |
| 2,880,083 | 3/1959 | Wienert | 75/33 |

Primary Examiner—L. Dewayne Rutledge
Assistant Examiner—G. K. White
Attorneys—Milton Zucker and Eugene G. Seems ABSTRACT: Iron, in the form of iron powder or a soft readily powdered agglomerate thereof, is prepared simultaneously with powdered active carbon, by heating an iron oxide, in the form of powder or a soft readily powdered agglomerate thereof with a stoichiometric excess of a powdered coal char which will react with carbon dioxide at the temperature employed at a rate above 10 percent per hour, at a temperature controlled so that the charge is maintained throughout the reaction at between 1,775° F. and 1,875° F. The temperature is most readily maintained in production units by passing the gases used to supply the necessary extraneous heat across the path of travel of the charge, rather than along the path of travel.

INVENTORS
ROBERT T. JOSEPH
ERIK SALLER
JACK TRECHOCK
JOSIAH WORK

PROCESS FOR SIMULTANEOUSLY PRODUCING POWDERED IRON AND ACTIVE CARBON

BACKGROUND OF THE INVENTION

1. Field of the Invention

This invention is concerned with the production of iron by the reduction of iron oxide ores with solid carbonaceous reductants at temperatures well below the fusion temperature and with the simultaneous production of an active form of carbon, which may be recycled to the process, or recovered as product useful, for example, in the purification of water.

2. Description of the Prior Art

Iron is usually recovered from its oxide ores by reduction of the oxide, using carbon as the reducing agent. By far the commonest method is the blast furnace, in which iron ore, a flux a coke are heated together to produce molten pig iron and slag, the heat coming from the combustion of the coke to carbon monoxide, which reduces the iron oxide to metal while itself converting to carbon dioxide.

Much work has been done on iron oxide reduction processes in which the iron is to be produced in nonmolten form, and there have been hosts of processes proposed and worked on. Where iron powder is the desired end product, useful processes operating in commercial quantities in economic time cycles have involved the use of relatively expensive gaseous reducing agents such as hydrogen, which work at relatively low temperatures, of the order of 1,400 to 1,600° F. Where iron sponge (i.e., more or less sintered particulate iron) is satisfactory, as in copper recovery from ore leach liquors, it has been found possible to use solid carbonaceous reducing agents such as coal chars and cokes. However, the best of the prior art processes using solid reductants do not produce iron powder in commercial units; they either use hard pellets of the iron oxide as feed and produce porous pellets of sponge iron, or they use powdered ore and produce a sinter of the reduced iron.

It has been recognized that charred coal is a superior reductant in the low temperature reduction of iron Smith U.S. Pat. No. 3,126,277, issued Mar. 24, 1964. It has likewise been recognized that absolute temperature control is desirable in such processes if sintering is to be controlled Moklebust U.S. Pat. No. 2,829,042, issued Apr. 1, 1958. But despite the great amount of work done in this area, prior art workers have all concluded that if solid carbon is to be used as a reductant for economic reasons, in commercial operations the resultant product must be in the form of sinter or hard pellets.

SUMMARY OF THE INVENTION

We have discovered that it is possible to produce iron in the form of powder or soft readily powdered agglomerates in large quantities at high rates from iron oxide in the same form as the iron which is produced, by reduction with a solid carbonaceous reductant provided that:

1. the oxide is fed into the process either as a powder (passing about −6 mesh, and preferably substantially finer) or as a loose, open-pored, easily powdered agglomerate of such a powder;
2. the reductant is in powdered form, preferably in somewhat different size consist from the ore to permit eventual separation by screening;
3. the reductant is specially prepared by charring coals below the rank of anthracite under such conditions that the char reacts with $CO_2$ at the reduction temperature at a rate in excess of 10 percent consumed per hour;
4. the reductant is used in a stoichiometric excess over the iron oxide, of at least 25 percent, and preferably at least 50 percent, and preferably at not more than 500 percent excess.
5. the ore and the reductant are maintained in mixed condition while maintaining the temperature between about 1,775° F., and 1,875° F., as an upper limit, for a sufficient time to effect nearly total reduction, which takes place in a residence time of between about one-half to 5 hours. It is imperative that the temperature should not go above 1,875° F., or sintering will occur. Moreover, we have found that even in specially handled rotary kilns, it is difficult to keep the temperature under control, and prefer to use equipment in which the gases added and evolved travel across the path of the moving reduction mixture instead of along the path; this can be done in a multiple hearth furnace, or on a traveling grate.

Surprisingly, the excess carbon separated from the iron product is in a highly active form, useful for example in water purification.

THE DRAWINGS

In the drawings which illustrate the invention:

DETAILED DESCRIPTION OF THE INVENTION

Figure 1:
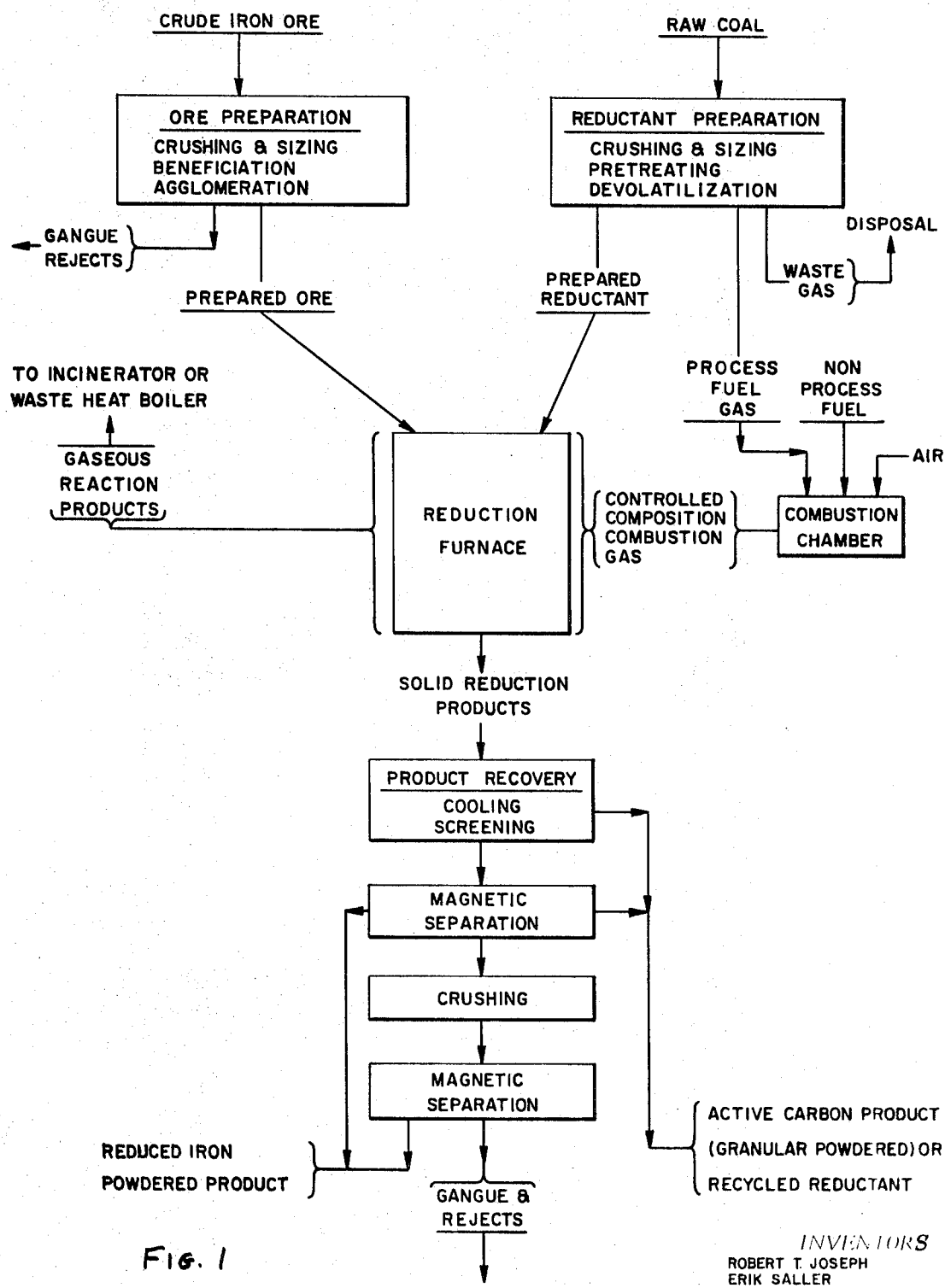
FIG. 1 is a generalized flow sheet of the invention in block form, with the ore feed in loosely agglomerated form.

In practicing the instant invention, we may use any form of iron oxide, either relatively pure or containing impurities. The impurities in the oxide remaining in the mixture after reduction are separated from the reductant by screening, and finally from the reduced iron particles by magnetic means. We prefer of course to use relatively pure iron oxide ores, and the various high grade hematite and magnetic ores, and beneficiated material made from low grade ores, are preferred feeds.

The oxide for use in our process should be present as a fine powder. It must be ground to pass at least a 6-mesh U.S. Standard Sieve and we prefer that it be ground to pass through 60 mesh. However such a powdered ore can also be loosely agglomerated in known fashion, to produce a soft, porous agglomerate which repowders easily. As an example of how a loose agglomerate can be made, a formulation of two parts by weight of starch of any commercial variety, such as "Corn Starch" specified as "Mogulstarch-B-211" produced by "The Corn Products Sales Co." and 98 parts by weight of the selected and prepared, iron ore are thoroughly blended in any mixer suitable for such an operation. After mixing these two ingredients until a satisfactory dry blend is obtained, as indicated by criteria normally used to judge dry-blending operations, water amounting to 10 to 15 percent of the weight of the dry blend is added and the mixing continued until a doughlike consistency is attained. This consistency is considered achieved when the dough, rolled between the palms, forms mudlike balls of about three-eighths to one-half inch in diameter.

The amount of water added is critical only to the extent indicated. In most instances to the 10 to 15 percent limit will produce the desired product. However, there will be some ores wherein the natural clay content may require more water than here noted. The increased amount can be determined experimentally by application of the simple palm-rolling test. If too little water is used, the mix will be dry and friable in the palms. If too much water is added, the mix will remain liquid in the palms.

When the proper mix consistency is obtained, the dough is transferred to a screen, which is in gyrating motion, such as a "Ro-rap" tester. Light pressure is applied manually or mechanically in such a fashion as to cause a haphazard rolling motion wherein small balls or pellets of different sizes are formed. Two screen sizes are used. The balls or pellets may be formed as an example on an 8-mesh Tyler sieve. The wanted product is collected on a 14-mesh Tyler sieve. The materials passing the 14-mesh sieve are collected and recycled to the mixer. In this way, the yield of pelletized iron ore is sustained at 100 percent.

This operation may be carried out on laboratory size testing sieves (8 inch in diameter) or in production facilities with large frames (18×36 inch) motor-driven on a chassis which reproduces the laboratory forces and product.

The resulting −8 mesh by +14-mesh sized agglomerates are dried in an oven or on a grate or any similar equipment wherein air or gas or combustion products, maintained at about 200 to 250° F., (90–120° C.) circulate through a bed to drive off water and harden the agglomerates.

The product so produced is a uniform-sized, porous agglomerate containing about 50 percent or more by volume of a large-size interconnected pore structure. This loose pore structure permits penetration by the reducing gases at such a high rate that the pellet interior is heated and reacted, for all practical purposes, in about the same time as its surface. The dry agglomerate may be used immediately or stored for some practical period to be used at some date future to its production. It, or the iron product obtained on reduction, is readily powdered.

In any event, whether fed as powder or loose agglomerate, the finished metal coming out of the process will have essentially the same particle size consist as the original feed. If powder is fed powder comes out; if loose agglomerate is fed, loose agglomerate comes out. The loose agglomerate can be broken up into powder just as readily as the loose agglomerate of the oxides. Feeding a loose agglomerate simplifies separation of the active carbon product from the iron product.

The reductant should be fed into the process in powdered form. In order to facilitate separation from the finished iron any any impurities by simple screening, the reductant is sized somewhat differently from the oxide. It is necessary first to select a coal which on charring will give the desired reactivity. Anthracite coal will ordinarily yield chars with too low a $CO_2$ reactivity, whereas bituminous and lignite coals will all yield desirably high reactivities.

The $CO_2$ reactivity of the finished char can be raised sharply in known fashion by adding to the reductant, at any stage in the process of preparing the char, a small percentage of a metal salt, such as sodium carbonate.

While the $CO_2$ reactivity of anthracite coal chars can be raised slightly above 10 percent by the addition of an activator, the resultant reductant is still commercially unsatisfactory. All lower ranks of coal, from low volatile bituminous coals through lignites, can produce chars with the necessary $CO_2$ reactivity and reducing power.

It is necessary, once the coal is selected, to ensure that the powdered coal can be charred without agglomeration. Some coal can be dried and heated rapidly to the tar evolution point without agglomerating. Most coals, however, should be treated at between 250° F. and the tar evolution point in the presence of added oxygen, to ensure that they will not agglomerate when heated above the tar evolution point. This treatment is a well-known expedient in the art.

The critical step in the production of the reductant comes during the removal of the tar forming vapors from the nonagglomerating powdered material produced from the original powdered coal. It is essential that when this material is heated above the point where tar-forming vapors evolve, substantially all of these vapors are removed at temperatures below the point at which they crack and deposit carbon on the charred reductant. This temperature is generally just above 1,200° F. If the vapors are allowed to come into contact with the char at higher temperatures, the deposition of carbon from the cracking of the tar will effectively reduce the carbon dioxide reactivity of the reductant to below the point at which it is useful for the practice of this invention. This removal of tar-forming vapors can be done with many coals in a single stage; some coals, especially highly agglomerating coals like the coking coals, require more than one stage to remove the tar formers.

At this stage where all the tar-forming vapors have been removed, the reductant can be mixed with the ore and used for reduction. However, better economy in the process is obtained by further stripping of gaseous volatiles, which can be burned to supply heat for the overall exothermic reduction in a more economical manner than they can be utilized at the point of reduction. However, it is essential that the reductant at the time it is heated together with the oxide retain a small amount of its original volatiles. The hydrogen content of the reductant actually mixed with the oxide at reduction temperatures should be 1 percent minimum in order to get the desired $CO_2$ reactivity. To retain this amount of hydrogen, the final stage of the charring should not exceed 1,800° F.

The production of the reductant is preferably carried out in a series of fluidized beds, using the precaution specified in U.S. Pat. No. 3,140,241 issued July 7, 1964. However, it is possible to obtain the desired reductant in various apparatus. For example, the coal can be fed into the uppermost hearth of a multihearth furnace equipped with rotating rabbles for each of the hearths, and the charring conducted on the upper hearths of the furnace. The oxide is then mixed with the reductant and the reduction is carried out in the lower hearths of the furnace. However, this requires great care in the handling of the uppermost hearths, and good insulation on the hearth beds to ensure against overheating of the upper hearths. The first deagglomerating stage is the most difficult to carry out in such a furnace, and we prefer to carry out at least this stage in a fluidized bed. Moreover, the problem of the handling of the tar vapors and the proper utilization of those and other vapors for heating purposes makes it desirable to carry out the entire production of the reductant outside of the furnace, in a manner which will hereinafter be described in connection with the drawings.

It is essential in practicing the process that the reductant be used in a stoichiometric excess over the iron oxide, in order to ensure that that portion of the iron at the surface of the mixture is not accidentally reoxidized. An excess of at least 25 percent over theoretical seems to be essential; below 50 percent, extreme care must be used; and we prefer to operate at from 300 to 400 percent excess.

Using the temperatures hereinafter described for the reduction and the specially prepared reductant of this invention, the excess reductant is transformed in the course of the reaction into a very excellent grade of powdered active carbon, with an iodine number in the range of 500 or higher. This is one of the great economic advantages made possible by the practice of this invention. Apparently the activation is accomplished by the reaction of $CO_2$ with the carbon to form CO, which appears to be the active agent for reducing the iron oxide.

Because the activation of the excess reductant is due to this reaction, along with incidental reaction with some of the $CO_2$, oxygen and water vapor in the atmosphere above the charge, the excess of reductant should not be more than 500 percent over stoichiometric, to guard against somewhat diminished activation of the total of reductant mass. Higher amounts can be use, however, without interfering with the reduction reaction except to decrease the net throughout of iron.

Near the lower temperature and reactivity limits, reduction may sometimes require a residence time of about 5 hours to approach a desirable degree of reduction, in excess of 90 percent of the oxide. At the high end of the temperature and reactivity range, residence times of one-half hour will produce almost complete reduction with some ores and highly reactive reductants. These times vary somewhat with the nature of the feed, as to chemical composition, size consist and actual structure of the oxide particles.

There is no difficulty in controlling the temperatures in laboratory-sized equipment, since uniform heating is not difficult to achieve. However, commercial equipment poses a very difficult problem of ensuring that none of the charge is heated above the critical sintering temperature. Even the specially designed rotary kilns described in Moklebust U.S. Pat. No. 2,829,042 pose real difficulty in operation. We have found that this difficulty is not present in the equipment in which gases added and evolved move across the path of the reduction mixture instead of along its path. This can be accomplished in a travelling grate, for example, with the gases kept in a multiplicity of separate sections and carefully controlled in their passage across the path of travel of the grate. However, the simplest and preferred form of equipment is the typical multiple-hearth furnace such as will be described in the accompanying drawings.

Figure 2:
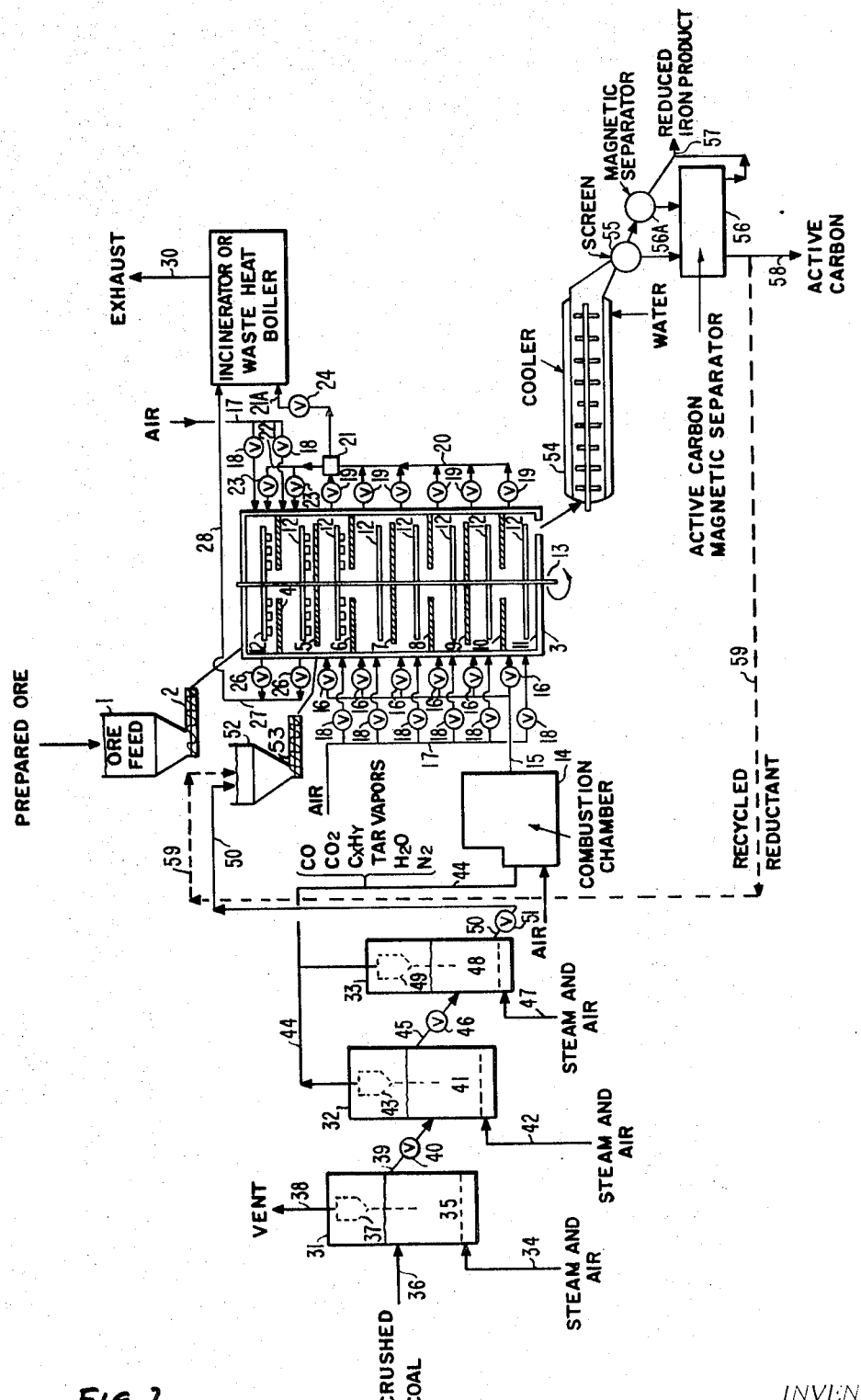
FIG. 2 is a schematic diagram of one way in which the invention may be carried out, the end separation being shown for powdered ore feed.

In the drawings, FIG. 1 is a flow sheet of the process in block diagram form, and is self-explanatory. FIG. 2 is a diagrammatic flow sheet illustrating a preferred method of practicing our invention. The ore, prepared as necessary, is charged to ore feed bin 1, and carried through a screw feeder 2 to the top of furnace 3. The reduction furnace is divided into a plurality of chambers by hearths 4 through 11. The openings between the hearths are small and only a minor part of the gases passes from one hearth to another.

The furnace is divided into two main sections which are mechanically integrated by rabbles 12 and rotating shaft 13. The division into sections is functional with the top section consisting of hearths 4 and 5 acting as ore preheating areas to preheat the incoming ore by scavenging heat from hot reaction gases developed in the reaction section; an oxidizing atmosphere may be used in these sections to accomplish sulfur removal in known fashion. The bottom section, consisting of hearths 6, 7, 8, 9, 10, and 11 is used for the actual reduction of the ore by the reductant which is added hot to the preheated ore on hearth 6. Heat to run this endothermic reduction reaction is supplied by hot combustion gases from combustion chamber 14 through manifold 15. The amount of these hot combustion gases fed to each hearth is controlled by valved inlets 16 to each hearth. These valves permit accurate control of temperature on each hearth. Further control of temperature and atmosphere on each hearth is made possible by operating combustion chamber 14 with only sufficient air to produce a gas rich in carbon monoxide. Additional air to maintain precise temperature conditions is introduced directly to each individual hearth from air manifold 17 and valved air inlets 18. The reaction hot gas product leaves the individual reaction hearths by individually operated valved exits 19 and manifold 20 which leads the gas product to division point 21. At division point 21 the hot gases are caused to flow in a precisely controlled fashion in the quantity necessary to preheat the ore on hearths 4 and 5 by control valve 24 through manifold 22 and valved inlets 23 which control that amount of hot gases that are not necessary for preheat. This unnecessary quantity of hot reaction gas is carried to waste-heat generator via line 21-A. The spent gases from ore-preheating leave hearths 4 and 5 through valved exits 26, manifold 27 and line 28 to incinerator 29. Spent incinerator gases are vented via stack 30.

The crushed coal is fed into a series of three vessels 31, 32, and 33 in which it is converted to the desired reductant by a series of fluidized bed reactions. In the first vessel 31, steam and air are fed into the bottom of the vessel by line 34 to maintain a fluidized bed 35 of crushed coal particles, which are fed into the fluidized bed by line 36. In this fluidized bed the coal is heated to a temperature above about 250° F. and below the point at which tar vapors are evolved. With highly oxygenated coals heating with steam or combustion gases in the absence of air is sufficient to dry the coal, which is already nonagglomerating. With most coals, i.e., those containing less than about 15 percent combined oxygen, it is necessary to introduce some oxygen into the fluidized gas. This reacts with some of the combined hydrogen in the coal to form water vapor. The gases leave the fluidized bed, passing out of the vessel 31 through a cyclone 37 and a vent 38.

The treated, crushed coal passes through an exit line 39 containing valve 40 into vessel 32. A fluidized bed 41 is maintained in this vessel by means of steam and air supplied through line 42. Here the material is heated in known fashion for a time sufficient to remove substantially all of the tar-forming vapors. The temperature should be above that at which tar-forming vapors are produced, (depending on the feed, from about 825° F., to about 1,150° F.), and not above 1,200° F., at which point the tars will crack. The gases produced pass through cyclone 43 into a line 44 from which they are fed to the combustion chamber 14 to produce heat for the reduction.

The charred coal particles pass out of the chamber 32 through line 45 containing valve 46 into the third chamber 33 which is fluidized as before by gas coming in through line 47 to form a fluidized bed 48. In this chamber temperatures up to about 1,800° F., may be used to reduce the volatiles in the coal to the order of about 2-5 percent. Substantially higher temperatures than 1,800° F., will render the product nonreactive with carbon dioxide and unsatisfactory for our reduction process because of too small a hydrogen content. The gas evolved passes through a cyclone 49 into the line 44 for feed to combustion chamber 14; the reductant is fed to the reduction furnace.

The operation of these vessels for the purpose of making a product useful in the production of coke is described in U.S. Pat. No. 3,140,241 issued July 7, 1964. In general our process can utilize the raw coals, except anthracite, and other feed materials, an essentially the same conditions for production of reductant as disclosed in that patent.

The reductant from bed 48 is fed through line 50 and valve 51 into a feed hopper 52 from whence it is fed into the furnace 3 by means of a screw conveyor 53. The ore coming down from the second hearth of the furnace mixes with the reductant coming into the third hearth of the furnace. One of the advantages of operating in accordance with the preferred method shown in the drawings is that the reductant and ore are both very close to the desired reaction temperature in the third hearth, so that operation of the furnace is simplified. The mixture is kept moving by rabbles 12 and moves down from hearth to hearth finally being discharged into a cooler 54. From the cooler 54 the mixture is discharged onto a screen 55 where a preliminary separation of the active carbon and fine gangue from the reduced iron is made. The active carbon and fine gangue from the reduced iron is made. The active carbon and fine gangue are passed over magnetic separator 56, where any fine reduced iron is removed and collected with the main iron product which has been passed over another magnetic separator 56A. The reduced iron product is withdrawn at 57 and active carbon is withdrawn at line 58 and recirculated to the reduction chamber as indicated in the drawing through line 59 to act as fresh reductant when necessary.

The separation of the active carbon from the iron and gangue at the end of the process is somewhat simplified if the oxide was fed in loosely agglomerated form. In this case, there is a considerable size difference between the reduced iron, and gangue, which remain in agglomerate form, and the carbon, so that screening is very simple. The reduced agglomerates may be used as such in many cases; for example, in the recovery of copper from solution by cementation processes, or the reduced agglomerate may be crushed to powder and further purified from any remaining gangue by known magnetic separation procedures.

Figure 3:
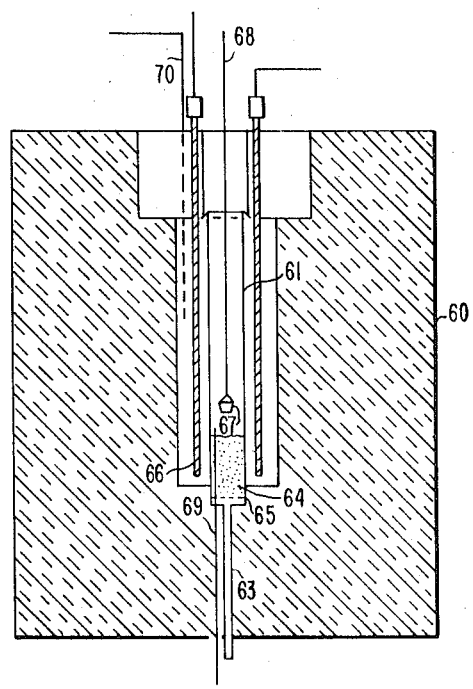
FIG. 3 is a cross section throughout the apparatus used for determining the $CO_2$ reactivity of the reductant.

FIG. 3 shows the apparatus for determining $CO_2$ reactivity used by the inventors herein. The apparatus comprises a cylinder 60, 24 inches in diameter and 28 inches high, with a central cylindrical opening in which a reaction tube 61 is inserted. The reaction tube comprises a main body portion 1¾ inches in diameter and 12 inches high; a gas inlet tube 63 connects the bottom of the reaction tube with a source of gas preheated to the desired temperature. The bottom 3 inches of the reaction tube is packed with a bed 64 of ⅛ inch Alundum granules held by a platinum screen 65; this bed serves to ensure proper gas temperature. Electric heating elements 66 are used to maintain heat.

The sample to be tested is placed in a nickel crucible 67 about ½ inch in diameter and ⅜-inch high; it is suspended by 16 BWG nickel wire 68 attached to an analytical balance (not shown) so that it and its support can be weighed continuously.

A thermocouple 69, with its sensor just one-fourth inch from the bottom of the basket 67, is used by the operator so that he can control the gas temperature and the heating elements to keep the temperature in the reaction tube constant.

A nitrogen sweepline 70 is provided to speed the flushing of the system on start up. 0.95 to 1.0 gram of reductant is placed in the previously preheated basket, the furnace being previously purged by a flow of 10 standard cubic feet per minute (s.c.f.m.) of nitrogen at the desired reaction temperature. After a 10-minute preheat period to ensure stabilization of temperature, the weight of the devolatilized sample is taken, and the flow of gas is changed to a mixture of 9 s.c.f.m. of nitrogen and 1 s.c.f.m. of $CO_2$. Weights are then recorded at desired intervals; $CO_2$ reactivity is determined by percentage loss of weight per unit of time.

It has been noted that generally the rate of reaction remains constant to about 50 percent burnoff.

In recovery of product, the reduced iron and reductant are preferably first separated by some mechanical means, as screening or gas classification, which takes advantage of the differences in specific gravity, and then by magnetic means to complete the separation.

EXAMPLES OF THE INVENTION

The following typical examples of the invention are given by way of example and not as limiting of the invention:

| Reductant | Source of coal | Grade of coal | $CO_2$ reactivity of reductant at 1,800° F., percent weight loss per hour |
|---|---|---|---|
| A | Lykens Mine, Pennsylvania | Anthracite | 4.1 |
| B | Pocahontas Mine, West Virginia | Low volatile bituminous | 6.4 |
| C | Pico Quemado Mine, Argentina | Medium volatile bituminous | 29.8 |
| D | Letherwood Mine, Kentucky | Medium volatile A bituminous | 24.6 |
| E | Athens, Ohio—Ohio No. 6-Seam | High volatile A bituminous | 22.6 |
| F | Old Ben, Illinois | High volatile B bituminous | 22.2 |
| G | Nigeria | High volatile C bituminous | 18.7 |
| H | Elkol Mine, Wyoming | Sub-bituminous | 23.5 |
| I | Helper Mine, Utah | do | 24.3 |
| J | Sandow Mine, Texas | Lignite | 57.2 |

Example 1.—Preparation of Reductants

A group of coals was treated in the apparatus described in the drawings by grinding to −10 mesh and then feeding into the series of fluidized beds, maintaining the first reactor at about 250 to 5000° F., for a residence time of 10 to 40 minutes, using amounts of air in the fluidizing media varying from 0 percent F. the sub-bituminous coals to about 50 percent for the high volatile bituminous coals, along with steam to obtain a superficial velocity of 1 foot per second which will create a boiling bed condition. In the carbonization chamber a similar velocity of steam mixed with air was used, the air being in sufficient quantity to maintain the bed temperature at about 870° F. The residence time was varied with the coals, but was just sufficient to remove all of the tar vapors. In the third boiling bed, temperatures of 1,600° F. were used, with residence times sufficient to produce material with 3 percent volatiles. The following results were obtained:

Example 2

The various reductants of Example 1, screened to pass a 6-mesh Tyler sieve were reacted with a relatively pure beneficial magnetite ore containing about 2 percent gangue, and ground to pass 60-mesh sieve, using equal weights of reductant and ore. The bed temperature was maintained at 1,800° F. with a reaction environment of b 1,830° F. After 60 minutes the product was withdrawn. Reductant A gave 60.6 percent reduction and Reductant B gave 63.8, whereas all of the examples C to J gave reductions in excess of 90 percent. Byproduct coke was also tested and gave 39.4 percent reduction.

This work was all done in laboratory crucibles, and in this test no measures of the activation of the excess carbon were undertaken.

Example 3

In Example 3, the successful reduction of iron ore demonstrated on laboratory scale in Example 2 was carried out in equipment prototype to the integrated flow sheet described in FIG. 2. The reductant produced from coal "H" in Example 1 ("Elkol"Coal from the Adaville Seam in Elkol, Wyoming) was mixed with a beneficiated magnetite from Pitkin,

TABLE FOR EXAMPLE 3.—OPERATING CONDITIONS ETC.

[Operating conditions, equipment description, production rates, feed stock and product analyses for pilot scale reduction of iron ore by the process described in this invention]

| | Example Number | |
|---|---|---|
| | 3-A | 3-B |
| Iron ore | Pitkin Colorado magnetite | Pea-Ridge, Mo., hematite. |
| Size | 8 x 14 mesh loose agglomerate. | 8 x 14 mesh loose agglomerate. |
| Reductant (100%−16 Tyler mesh) | Elkol char (Example 1 H) | Elkol char (Example 1 H). |
| Length of run | 48 hours | 3 hours. |
| Amount of ore | 420 pounds (69% Fe) | 30.5 pounds (66.3% Fe). |
| Amount of reductant | 420 pounds (90% C) | 30.5 pounds (90% C). |
| Reductant to iron oxygen ratio | 3.6/1.0 | 3.7/1.0. |
| Reaction temperature | 1,800° F | 1,820° F. |
| Residence time | 60 minutes | 36 minutes. |
| Gas phase composition (propane combustion, reducing) | CO, $CO_2$, $H_2O$, $N_2$, $H_2$ | CO, $CO_2$, $H_2O$, $N_2$, $H_2$. |
| Total feed rate (nominal) | 30 lbs./hour | 20 lbs./hour. |
| Metallic iron product recovered | 293 lbs. (87.2% Fe) | 19 lbs. (92.44% Fe). |
| Carbon product recovery | 192 lbs. (89.0% C) | 23 lbs. (89.0% C). |
| Carbon consumed in reduction | Approx. 60 lbs | Approx. 4 lbs. |
| Carbon consumed by gasification | Approx. 168 lbs | Approx. 3 lbs. |
| Internal burnoff of carbon | 35.0% | 42.8%. |

| | Feed stock | Product | Feed stock | Product |
|---|---|---|---|---|
| Iron phase: | | | | |
| Total iron, percent | 69.0 | 94.2 | 66.2 | 92.4 |
| Metallic iron, percent | .01 | 87.2 | 0.0 | 86.4 |
| Iron bound oxygen, percent | 26.3 | 1.9 | 27.8 | 1.7 |
| Gangue, percent | 3.6 | 3.9 | 6.0 | 5.9 |
| Size, Tyler Sieve | 8 x 14 | 8 x 14 | 8 x 14 | 8 x 1 |
| Grinds easily to— | | 100%−100 | | 100%−100 |
| Carbon phase: | | | | |
| Size, Tyler Sieve | −14 | −14 | −14 | −14 |
| Bulk density (lbs./cu. ft.) | 46 | 28 | 46 | 27 |
| Volatile, M, percent | 3.0 | 2.0 | 3.0 | 2.0 |
| Fixed C, percent | 90.5 | 89.0 | 90.5 | 88.5 |
| Ash, percent | 6.5 | 9.0 | 6.5 | 9.5 |
| Apparent density (mercury) gm./ml | 0.98 | 0.65 | 0.98 | 0.63 |
| Surface area ($N_2$ absorption) $M^2$/gm | 160 | 950 | 160 | 805 |
| Iodine Number mg. $0.1NI_2$/gm. carbon | 132 | 965 | 132 | 567 |
| Phenol value | 45 | 16 | 45 | 20 |

Colorado, and with a hematite from Pea Ridge, Mo. These reaction mixtures were charged to a 4-hearth rotary arm furnace (18inch in inside diameter produced and sold as commercial ore-roasting equipment by the Skinner Furnace Division of the Mine and Smelter Corporation) and held under reducing conditions at 1,800° to 1,850° F., for 36 to 60 minutes. Better than 90 percent reduction of the iron content of the ore was achieved and an active carbon with a surface area of better than 800 m. $^2$/gm. were recovered in good yield as coproducts. Detailed data on conditions an analyses are contained in the accompanying table.

A similar run was made with reductant F of Example 1 (an Illinois No. 6 seam coal from the "Old Ben" Mine, a high-volatile B-bituminous coal) and the same Pitkin magnetite, using a total of 20 pounds of each material. The resultant products were excellent iron and active carbon. However the run was too short to get effective material balances.

Example 4

A study was made of the effect of recycling the primary active carbon product as a reductant with virgin ore on the rate at which the reduction reaction proceeded. The magnetite ore of Example 2 was used together with a reductant similar to reductant F but made under somewhat different conditions so that it had a $CO_2$ reactivity of 17.6 weight percent per hour. Originally, equal parts by weight of the reductant and ore were used in laboratory crucibles and a cycle of three deductions undertaken for 60 minutes at about 1,825° F. In the first reduction 95.6 percent of the ore was reduced within the hour and the residual carbon had $CO_2$ reactivity of 22.2 percent. This was again mixed with an equal weight of ore. On the second run 95.6 percent reduction was obtained and the residual carbon had $CO_2$ reactivity of 22.5 percent. On the third run, the material was again mixed with an equal weight of ore, and there was obtained 94.2 percent reduction and a product with a $CO_2$ reactivity of 22.7 percent. The iodine number of the final product was determined and found to be much over 500. However, it was present in much lower quantity, much of it having been consumed during the three reactions.

In a similar fashion reductants "H" and "J" of example No. 1 were used to reduce the magnetite ore of Example No. 2. These experiments were carried out in laboratory crucibles to note the effect of reductant recycle not only on $CO_2$ reactivity of the carbon residue from the reaction, but also the final active carbon coproduct. Table for Example 4 lists results for these three experiments. It is readily seen that recycle of reductant is beneficial to the reductant $CO_2$ reactivity and active carbon quality.

TABLE FOR EXAMPLE 4

[Effect of reductant recycle on reductant $CO_2$ reactivity and active carbon property]

| | Reductant letter | | |
|---|---|---|---|
| | F | H | J |
| $CO_2$ reactivity of virgin reductant (wt. percent) | 17.6 | 43.0 | 65.6 |
| $I_2$ number of virgin reductant, mg. $I_2$/gm | 70 | 133 | 250 |
| Ratio, parts of ore to parts of reductant | | 1 to 1 | |
| First reduction: | | | |
| Percent reduction achieved | 95.6 | 95.9 | 94.4 |
| $CO_2$ reactivity | 20.2 | | |
| $I_2$ Number | 328 | 507 | 643 |
| Second reduction: | | | |
| Percent reduction achieved | 95.6 | 96.1 | 93.4 |
| $CO_2$ reactivity | 22.5 | | |
| $I_2$ Number | 519 | 590 | 709 |
| Third reduction: | | | |
| Percent reduction achieved | 94.2 | 95.0 | 91.8 |
| $CO_2$ reactivity | 22.7 | | |
| $I_2$ Number | 597 | 656 | 765 |

Example 5

A series of iron ores using equal weight of reductant (Example 1-H) were run in laboratory crucibles all ground to pass 100 through a 60-mesh sieve, using equal parts of reductant and ore. The reaction time was 60 minutes, and the temperature 1,800° F. The following materials were tested, and the percentage reduction is indicated:

| | Chemical form of the iron | Percent total iron in ore | Percent reduction after 60 min. reaction |
|---|---|---|---|
| Synthetic ferric oxide (Baker's ACS) | $Fe_2O_3$ | 69.94 | 97.7 |
| Hewitt hematite | $Fe_2O_3$ | 48.40 | 95.6 |
| Steep rock hematite | $Fe_2O_3$ | 55.30 | 97.2 |
| Specular hematite | $Fe_2O_3$ | 51.90 | 95.4 |
| Earthy hematite | $Fe_2O_3$ | | 95.9 |
| Taconite | $Fe_2O_3$ | | 96.8 |
| Magnetite | $Fe_3O_4$ | 64.7 | 95.5 |
| Siderite | $FeCO_3$ | 40.04 | 93.7 |
| Limonite | $Fe(OH)n.H_2O$ | 41.6 | 96.0 |
| Ilmenite | $Fe_3O_4.TiO_2$ | 11.0 | 94.0 |

Obviously, the examples can be multiplied indefinitely without departing from the scope of the claims.

What is claimed is:

1. In the process for producing iron iron ores by reduction with carbon at temperatures below the melting point of the iron, the improvement which permits the reduced iron to be recovered in the same particle size consist as the iron ore which is fed, which comprises using the ore either in the form of powder or as an open-pored easily powdered agglomerate of such a powder, using a powdered reductant which is a char of a coal below the rank of anthracite and which has a $CO_2$ reactivity at the reduction temperature in excess 10 percent per hour and contains at least 1 percent of hydrogen, the reductant being in at least 25 percent stoichiometric excess over the iron, and maintaining the ore and the reductant in mixed condition at a temperature between 1,775° and 1,875° F. by an internal stream of hot gas for between ½ and 5 hours to effect nearly total reduction.

2. The method of claim 1 in which the reductant is used in a stoichiometric excess of between 50 and 500 percent.

3. The method of claim 1 in which the reaction mixture is heated by gases which travel across the path of the moving reduction mixture.

4. The method of claim 1 in which the excess reductant is separated from the product by mechanical means and then by magnetic means.

5. In the process for producing iron from iron ores by reduction with carbon at temperatures below the melting point of the iron, the improvement which permits the reduced iron to be recovered in the same particle size consist as the iron ore which is fed, and the excess carbon used as the reductant in the reaction to be activated into an active carbon powder with an iodine number of 500 or more, which comprises using the oxide either in the form of powder or a loose open-pored easily powdered agglomerate of such a powder, using a powdered reductant which is a char of a coal below the rank of anthracite which has a $CO_2$ reactivity at the reduction temperature in excess of 10 percent per hour and contains at least 1 percent hydrogen, the reductant being in at least 25 percent and not over 500 percent stoichiometric excess over the iron, and maintaining the ore and the reductant in mixed condition at a temperature between 1,775° and 1,875° F., maintained by an internal stream of hot gas, for between ½ and 5 hours, to effect nearly total reduction.

6. The method of claim 5 in which the iron ore is fed as a loose open-pored easily powderable agglomerate, and the reductant is of smaller particle size, and in which the excess reductant is separated from the reduced product and recovered at least in part as active carbon product.

7. The method of claim 6 i which the agglomerate separated from the reductant is broken up and the iron powder therein is separated from the gangue by magnetic means.

8. The method of claim 2, in which the excess reductant is separated from the product by mechanical means and then by magnetic means.

9 The method of claim 3, in which the excess reductant is separated from the product by mechanical means and then by magnetic means.

UNITED STATES PATENT OFFICE
CERTIFICATE OF CORRECTION

Patent No. 3,617,256  Dated November 2, 1971

Inventor(s) R.T. Joseph, J. Trechock, E. Saller, J. Work

It is certified that error appears in the above-identified patent and that said Letters Patent are hereby corrected as shown below:

Column 3, line 31 "any"/(first occurrence) should read --and--.

Column 4, line 55 "throughout" should read --throughput--.

Column 7, line 39 "5000°F." should read --500°F.--.

Column 7, line 41 "F." should read --for--.

Column 8, line 11 "beneficial" should read --beneficiated--.

Column 8, line 15 "b" should be omitted.

Column 7 & 8, Table 3 "8x1" should read --8x14--.

Column 9, line 74 "100" should read --100%--.

Column 10, line 21 "iron iron" should read --iron from iron--.

Column 10, line 29 "excess 10" should read --excess of 10--.

Column 10, line 67 "6 i which" should read --6 in which--.

Signed and sealed this 18th day of July 1972.

(SEAL)
Attest:

EDWARD M. FLETCHER, JR.  ROBERT GOTTSCHALK
Attesting Officer  Commissioner of Patents